United States Patent [19]

Schwitters

[11] Patent Number: 4,699,218
[45] Date of Patent: Oct. 13, 1987

[54] BEET HARVESTER WITH ELEVATED, TRANSVERSE DISCHARGE CONVEYOR

[75] Inventor: Wayne J. Schwitters, Clara, Minn.

[73] Assignee: Wic, Inc., Shelly, Minn.

[21] Appl. No.: 773,118

[22] Filed: Sep. 6, 1985

[51] Int. Cl.[4] ..................... A01D 25/04; A01D 61/00
[52] U.S. Cl. ...................................... 171/23; 171/58; 171/133; 171/138; 56/16.6; 130/5 D
[58] Field of Search .................. 171/11, 23, 58, 130, 171/126, 135, 138, 144, 133; 130/5 D; 56/16.6

[56] References Cited

U.S. PATENT DOCUMENTS

| | | | |
|---|---|---|---|
| Re. 29,121 | 1/1977 | Hook et al. | 171/58 |
| Re. 29,122 | 1/1977 | Hook et al. | 171/58 |
| 1,458,044 | 6/1923 | Ford | 171/23 |
| 2,239,899 | 4/1941 | Nightenhelser et al. | 130/5 D |
| 2,438,627 | 10/1948 | Walz et al. | 171/23 |
| 2,665,533 | 1/1954 | Bozeman, Sr. et al. | 171/23 X |
| 2,704,605 | 3/1955 | Dahlman | 171/11 X |
| 2,944,611 | 7/1960 | Rollins | 171/58 |
| 3,010,522 | 11/1961 | Oppel | 171/58 |
| 4,049,058 | 9/1977 | Eisenhardt et al. | 171/58 |
| 4,116,279 | 9/1978 | Kilburn | 171/58 |
| 4,197,916 | 4/1980 | Haverdink et al. | 171/58 |

FOREIGN PATENT DOCUMENTS

| | | | |
|---|---|---|---|
| 2847151 | 2/1980 | Fed. Rep. of Germany | 171/130 |
| 300138 | 6/1971 | U.S.S.R. | 56/16.6 |
| 397957 | 1/1974 | U.S.S.R. | 56/16.6 |
| 425576 | 10/1974 | U.S.S.R. | 130/5 D |

OTHER PUBLICATIONS

"Stretched-Tractor Lifter," in *Power Farming* (United Kingdom), Jan. 1987, p. 39.

"Sugarbeet Harvester" advertising brochure, WIC Inc., Halstad, Minn. 56548.
"Sugarbeet Harvesters" advertising brochure, Parma Company, Parma, Idaho 83660.

*Primary Examiner*—Robert A. Hafer
*Assistant Examiner*—Terrence L. B. Brown
*Attorney, Agent, or Firm*—Peterson, Wicks, Nemer & Kamrath

[57] ABSTRACT

During the first pass across a field of row-planted sugar or red beets, the apparatus digs the beets from a specific number of rows (six being illustrated but the apparatus herein disclosed can be structured for four or five rows as well), elevates the beets at one side of the apparatus to a given height and discharges the elevated beets into a tank from which they are periodically re-elevated and discharged into a truck at the side of the apparatus opposite the side at which they are elevated and re-elevated, the truck trailing the apparatus over rows from which beets have been removed when not receiving re-elevated beets. On the next pass in a reverse direction across the field, the truck runs in the swath where the beets have been removed during the first pass, and the beets during the second pass are continually discharged into the truck without resort to storage and without re-elevating the beets as done on the first pass. In this way, beets are run over by the truck only on the first pass, and even then to a minimum degree. Also the apparatus is better balanced by elevating beets at one side of the apparatus, and discharging them at the other side. A hydraulic system automatically controls certain motors in determining whether beets are to be discharged into a truck or stored. The apparatus additionally includes a special cleaning bed that assures a more complete cleaning of the beets.

13 Claims, 9 Drawing Figures

BEET HARVESTER WITH ELEVATED, TRANSVERSE DISCHARGE CONVEYOR

BACKGROUND OF THE INVENTION

1. Field of the Invention

This invention relates to a method and apparatus for efficiently harvesting sugar beets, as well as red beets.

2. Description of the Prior Art

Sugar beet harvesters, of course, are well known. A number of different types have been devised and marketed. Basically, sugar beet harvesters comprise a frame having wheels at the rear thereof, the front being connectable to a tractor hitch so that the harvester can be pulled across the sugar beet field. The beets are literally dug or pulled from the soil by means of paired lifting wheels having a slight rearward convergence, there being a pair of such wheels for each row. After being lifted by the converging wheels, rotating paddles or flails dislodge the beets by striking them rearwardly onto a cleaning bed. The cleaning bed moves the beets laterally to one side of the frame where they enter the lower portion of an elevator. The elevator then raises the beets to a height sufficient for them to be discharged into a truck, the discharging taking place at the same side of the harvester at which they are elevated. A typical beet harvester is generally described in U.S. Pat. No. 4,137,973, issued to me on Feb. 6, 1979 for "Beet Harvester with Spring System for Protecting Its Lifter Wheels and Paddle Shaft."

All of the sugar beet harvesters with which I am acquainted elevate the beets at one side of the harvester and once elevated discharge the elevated beets at that same side through the agency of an upper elevator extension which projects laterally over the box of a truck or other transport vehicle traveling along that side of the harvester. An example of such harvesting equipment is shown and described in U.S. Pat. No. 4,116,279, issued on Sept. 26, 1978 to Donald Lee Kilburn for "Hydraulic Beet Harvester." Elevating and discharging beets at the same side of a sugar beet harvester pose severe problems which have up to this time not been overcome.

SUMMARY OF THE INVENTION

Accordingly, a general object of my invention is to provide a sugar beet harvester that effectively and efficiently obviates the shortcomings that have heretofore been experienced. It is also within the purview of my invention to harvest red beets, as well.

More specifically, an object of the invention is to provide a sugar beet or red beet harvester that will be better balanced so that it will not cant or tilt appreciably when traversing soft soil, such as when the field is wet and muddy. In the achieving of this goal, it is planned that the beets, once removed from the soil, be elevated to an appropriate height at one side of the harvester, and then transferred at that height to the other side where they are discharged at the height to which they have been elevated into a truck traveling alongside the harvester. The generally horizontal portion of the elevator overhangs the side of the harvester, but it does so at the side thereof that is opposite the side where the beets are elevated. The vertical portion of the elevator, in effect, is counterbalanced by the generally horizontal portion that extends across the harvester and somewhat beyond the opposite side. Consequently, when the soil is wet, the harvester will still pull straight because one side thereof will not sink appreciably deeper into the ground than the other side because the difference in weight between the left and right sides of the harvester is substantially precluded when practicing my invention. This has the added advantage of causing the digging depth of the lifter wheels to be more uniform where muddy conditions are experienced.

Another object of the invention is to locate the tank in which sugar beets (or red beets) are to be temporarily stored under the generally horizontal portion of the elevator. It is within the purview of the invention to have the horizontal portion of the elevator comprised of two conveyor units, one of which can be reversed so as to direct the elevated beets into the tank therebeneath or conversely to discharge the beets into a truck traveling along the side of the harvester opposite the side where the vertical portion of the elevator is located. More specifically, it is planned that a third conveyor unit be located at the bottom of the tank and that it be operated in a manner such as to redirect the beets stored in the tank to the foot or entrance of the vertical portion of the elevator so that they can be re-elevated and then discharged into the truck traveling alongside the harvester as it traverses the field. It is contemplated that the hydraulic controls be quite simple, actually involving only the use of a single lever to either effect a discharge of the elevated beets into the truck alongside the harvester or to direct the beets into the tank beneath the horizontal portion of the elevator.

It is also an object of the invention to increase the height of the tank at the discharge side of the harvester so that when beets are being stored in the tank, the weight thereof can be increased more to the side where the truck will either be traveling or will later be traveling. By having the height of the stored beets increased at the truck discharge side, the counterbalancing effect with respect to the vertical portion of the elevator is enhanced. In other words, practical considerations dictate that the vertical portion of the elevator and one-half of the horizontal portion be somewhat heavier than the remaining horizontal portion, which remaining portion includes the overhanging extension, and that the build up of beets in the tank be increased more at the side of the elevator where the weight is normally less. Hence, there is a progressively improved balancing effect derived from the storage of beets in the tank, as well as having the beets discharged from the side opposite the side at which they are elevated.

Yet another object of the invention is to minimize the amount of time that the truck or other vehicle receiving the harvested beets runs over unharvested beets. During the first pass over the field, when practicing the teachings of my invention, it is unavoidable that the truck run over some unharvested beets. In this regard, it is planned that the harvested beets be directed into the tank beneath the horizontal portion of the elevator and later, when full, be discharged into the truck. The truck, under these conditions, would be trailing the harvester across the field so that it would be traversing a path where the beets had been removed from the ground. When the tank becomes full, then, and only then, the truck pulls alongside the harvester. At this time, the beets are removed from the tank in which they have been stored, re-elevated, and then discharged into the truck. The truck, after receiving the stored beets that have been re-elevated, returns to its trailing position behind the harvester where it again follows the harvester until the tank has been filled once again. The truck, when the tank is to be emptied once again pulls alongside the harvester so that the beets in the tank can be removed and re-elevated, and the second batch of re-elevated beets discharged into the truck. It is mainly after the first pass across the field that my invention becomes especially beneficial, for the truck can then continually travel alongside the harvester, receiving the beets continously from the side opposite the side of which they have been elevated. Prior art harvesters have required that the truck not only run on unharvested beets during the first pass or traverse of the field but do so during the second or reverse pass as well.

Still another object of the invention is to achieve a good distribution of the beets on the cleaning bed of the harvester. In this regard, an aim of the invention is to have the helical rib on the first grab roll be reversed in direction with respect to the helical ribs on the several other grab rolls. In this way, the beets are directed toward the center of the harvester and then caused to be moved in the direction of the foot or entrance to the elevator. It is also an aim of the invention to utilize a rake wheel that asssists in the initial directing of the beets toward the center of the harvester where they are then bumped by other beets arriving from the lifter wheels so as to be moved onto the grab rolls and then advanced toward the lower or entrance end of the elevator.

Also, the invention has for an object the provision of a sugar or red beet harvester that will be compact, sufficiently rugged so to require but little maintenance, and relatively simple so that it can be manufactured and sold at a comparatively low price, thereby encouraging its wide-spread use for harvesting sugar beets.

Briefly, my invention envisages the employment of certain components that are relatively commonplace as far as sugar beet and red beet harvesters are concerned, yet modifying other components so as to provide a method of harvesting beets, together with the apparatus for doing so, that will harvest the beets in a highly efficient and effective manner. The elevator has its vertical portion located at one side of the harvester, the elevator extending upwardly and then generally horizontally to the other side of the harvester and somewhat there beyond so that beets can be discharged into a truck at the side opposite the side at which they are elevated. The horizontal portion of the elevator, which actually inclines somewhat upwardly, is composed of two conveyor units so that one unit can be reversed in order to direct the elevated beets into a tank located beneath the horizontal portion of the elevator in contradistinction to being discharged into a truck alongside the harvester. A simple hydraulic control system is employed so that an additional conveyor unit at the bottom of the tank can be stopped and started automatically in accordance with the selected direction in which the reversible conveyor section above the tank is being operated. By better balancing the weight of the harvester on the two sets or pairs of trailing wheels, there being one set at each side of the harvester, the weight differential between the two sets of wheels is substantially reduced so that the harvester is better balanced, thereby minimizing any tendency for the harvester to tilt when the soil is wet or muddy. An improved method of harvesting sugar beets is also realized in that the truck or other vehicle into which the beets are loaded will not be required to run over as many unharvested beets as in the past.

DESCRIPTION OF THE PREFERRED EMBODIMENT

The sugar or red beet harvester (hereinafter referred to as a sugar beet harvester) illustrating my invention has been denoted generally by the reference numeral 10. The sugar beet harvester 10 includes a rectangular main frame 12 comprised of parallel plate-like side beams 14, 16, a front lower transverse tube 18, a front upper transverse tube 20 which is somewhat rearwardly of the tube 18, a rear lower transverse tube 22, and a rear upper transverse tube 24.

A pair of rearwardly directed struts 26 are attached to the upper tube 24, each strut 26 having an axle or shaft 28 projecting laterally from the opposite sides of its lower end. Rotatively mounted on each shaft 28 is a pair or set of wheels 30.

The harvester 10 has a drawbar 32, the forward end of the drawbar 32 being connected to the rear of a tractor 33 illustrated in phantom outline.

Inasmuch as it has been common nowadays to manufacture 6-row harvesters, such a harvester is herein illustrated. Therefore, six lifter wheel assemblies 34 are employed. These lifter wheel assemblies, there being one for each row, are clearly pictured in my hereinbefore identified U.S. Pat. No. 4,137,973. The lifter wheel assemblies 34, as their name implies, dig and then lift the beets from the ground. In the drawings, however, it has been somewhat simpler to show these assemblies 34 in their raised or transport condition. After the beets have been lifted from the ground, they are elevated to a sufficient height so that an equal number, six in this instance, of steel paddle units 36 strike the beets, kicking the beets rearwardly onto a pair of side-by-side inclined chain bed type conveyors 38. The use of chain bed conveyors 38 provide a first or initial cleaning stage for the beets.

Figure 6:
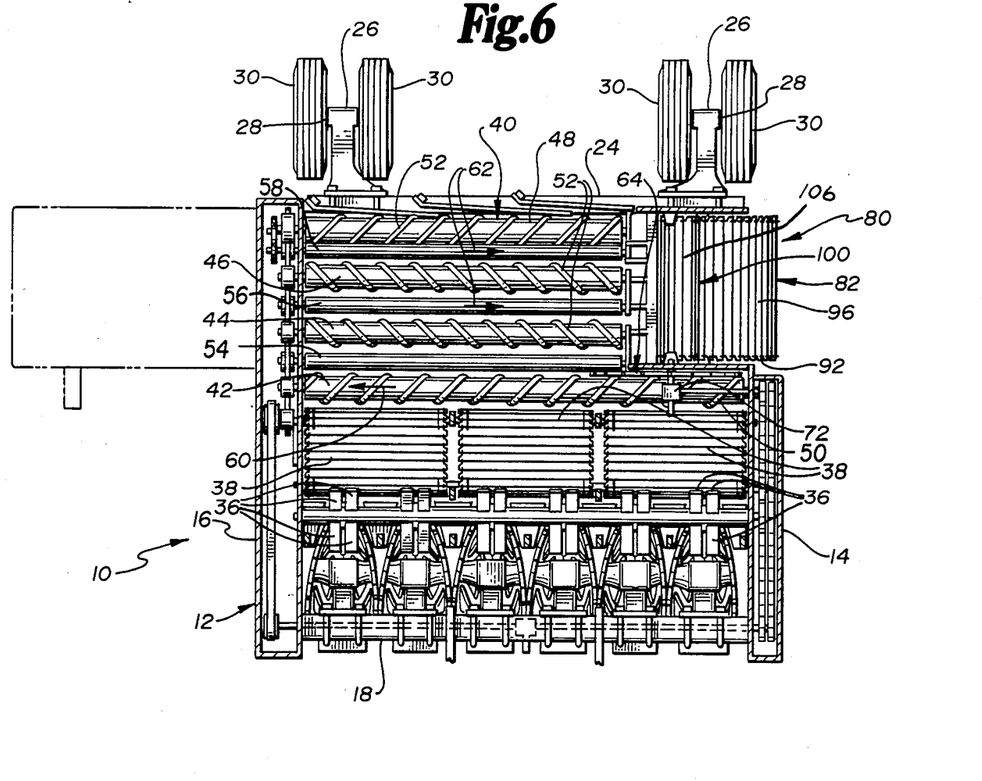
FIG. 6 is a top plan view resembling somewhat the top plan view in FIG. 1, but with the upper or generally horizontal portion of the elevator and the tank therebeneath removed so as to show to better advantage the cleaning bed that would otherwise be concealed (although the laterally extending segment of the generally horizontal portion of the elevator appears in phantom outline)

Up to this point, the components that have been referred to are conventional and are only generally described. Whereas cleaning beds have been employed heretofore, such as that shown in my U.S. Pat. No. 4,137,973, the cleaning bed 40 is believed to be an improvement, as will presently be understood. The cleaning bed 40 comprises four scroll-type grab rolls 42, 44, 46 and 48. From FIG. 6, it can be discerned that the first grab roll, this being the one nearest to the upper end of the inclined chain bed conveyors 38, has a helical rib 50. The grab roll 48 rotates in a reverse direction from that of the grab rolls 44 and 46, so as to throw the beets and dirt away from the rear wall of the harvester 10. Intermediate the ribbed rolls 44, 46 and 48 are ribless or smooth cylindrical rolls 54, 56 and 58. By reason of the direction in which the roll 48 rotates, it will be recognized that the rib 50 moves the beets in an opposite direction from that in which the ribs 52 move the beets. It will be helpful to apply an arrow 60 in FIG. 6 to indicate the initial direction of the beets as they pass onto the roll 42 and several arrows 62 denoting the direction in which the beets move by virtue of the manner the helical ribs 52 spiral. It should be pointed out that the grab rolls 42, 44 and 46 all rotate in the same direction; it is the reverse rotation of the roll 42 that is effective in providing the beet movement as indicated by the arrow 60. It should also be pointed out that the intermediate ribless rolls 54, 56 and 58, as well as the grab roll 48, are rotated in a direction opposite to that in which the rolls 42, 44 and 46 are rotated. The means by which the rotation of the rolls 42, 44, 46, 48, 54, 56 and 58 is achieved is conventional and need not be described in detail other than to say that a belt and pulley arrangement is employed.

Figure 7:
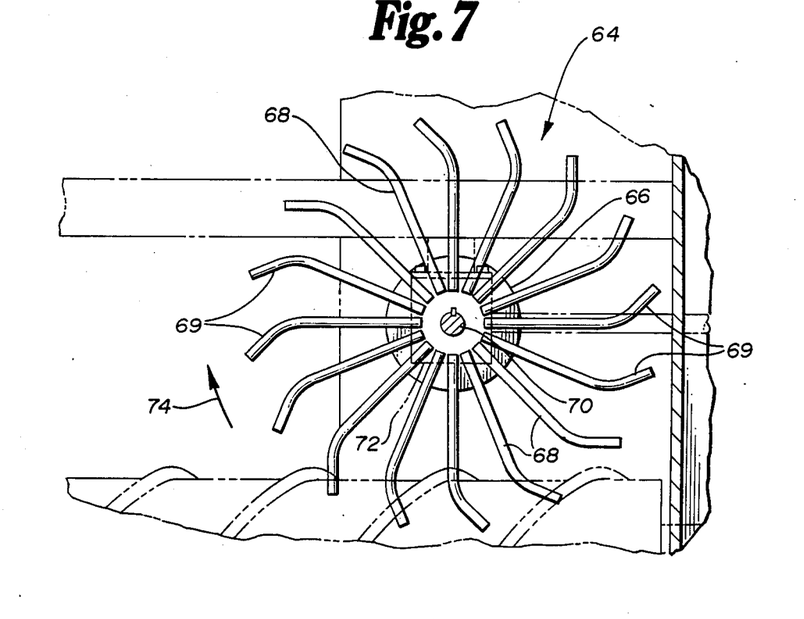
FIG. 7 is an enlarged elevational view of the wheel rake that directs some of the beets toward the center of the cleaning bed so that these beets traverse a longer cleaning path before being elevated.

It is important to recognize that a wheel rake or turbine 64 is employed for assuring a more positive beet movement in the direction of the arrow 60. As the description progresses, it will become apparent that it is highly desirable that some of the beets move in the direction of the arrow 60, doing so toward the center of the harvester in order to increase the cleaning time thereof. Thus, the wheel rake 64 includes a hub 66 having radially projecting tines 68 extending therefrom, the tines 68 being in the form of ⅜" rods with curved ends 69. The hub 66 is mounted on a shaft 70 that is driven via a gear box 72 coupled to a roller chain that will hereinafter be identified, the direction in which the rake 64 rotates being indicated by the arrow 74 in FIG. 7. In other words, when the beets adjacent the left side of the harvester 10 leave the inclined chain bed conveyors 38, the ends 69 of the tines 68 strike the leftmost beets so as to push them toward the center of the cleaning bed 40. These beets do not have to move completely to the center, but it will shortly become apparent that it is most desirable to have them move somewhat in a central direction in order that they be better cleaned.

At this time, attention is called to an elevator which has been denoted generally by the reference numeral 80. Although shown somewhat diagramatically in FIG. 8, it will be appreciated that the elevator 80 includes a vertical squeeze chain portion 82 and a generally horizontal, although slightly inclining, transverse portion 84. More specifically, the vertical portion 82 includes an outboard unit 86 comprised of a continuous series of horizontally oriented rods or bars that engage one side of the beets. It will be noted that the outboard unit 86 includes a lower section 88 and a vertical section 90. It will also be observed that there is a drive roller chain sprocket at 92 and a driven roller chain sprocket at 94. The unit 86 includes a hook link chain (also called a potato chain) or belted chain 96 entrained about the sprockets 92 and 94, the hook link (potato) or belted chain 96 entrained about the sprockets 92 and 94, the hook link (potato) or belted chain moving upwardly in the direction of the arrow 98. The gear box 72 is coupled to the chain 96, the gear box 72 driving the rake 64.

Figure 8:
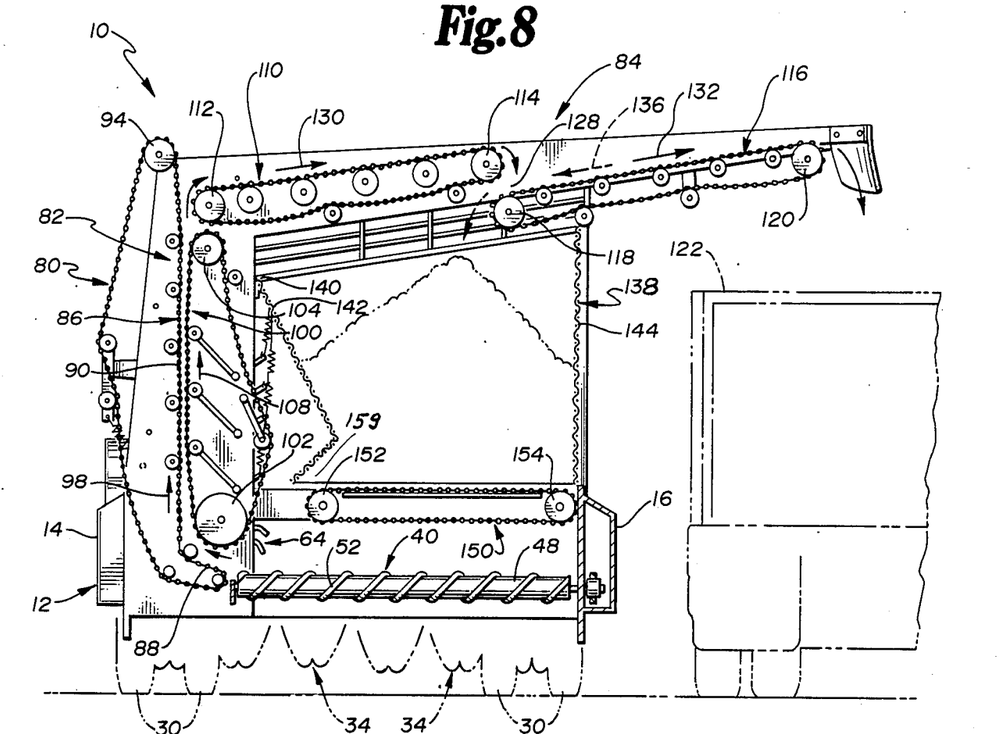
FIG. 8 is rear elevational view showing the cleaning bed, the entire elevator, the tank and the conveyor at the bottom of the tank but with the ground wheels, raised lifter wheels and truck shown in phantom outline.

The squeeze chain portion 82 additionally includes an inboard unit 100 also comprised of another hook link (potato) or belted chain 106. In this instance, there are sprockets 102 and 104 about which the chain 106 is entrained. The chain 106 moves upwardly in the direction of arrow 108.

Whereas the arrows 98 and 108 signify the movement of the units 86 and 100, both being vertically upwardly, it should be explained that the outboard unit 86 moves at a slightly faster rate than the inboard unit 100. By also having the outboard unit 86 extend upwardly past the upper end of the inboard unit 100, it can be appreciated that the beets that are conveyed or elevated upwardly are kicked centrally inwardly when they reach the upper end of the squeeze chain portion 82. In this way, the elevated beets are shifted onto a first conveyer unit 110 constituting the first or initial section belonging to the inclined conveyor portion 84. The conveyor unit 110 is entrained about a drive sprocket 112 and a roller 114. The generally horizontal conveyor portion 84 additionally includes a second conveyor unit 116 which is entrained about a drive sprocket 118 and a roller 120.

Figure 1:
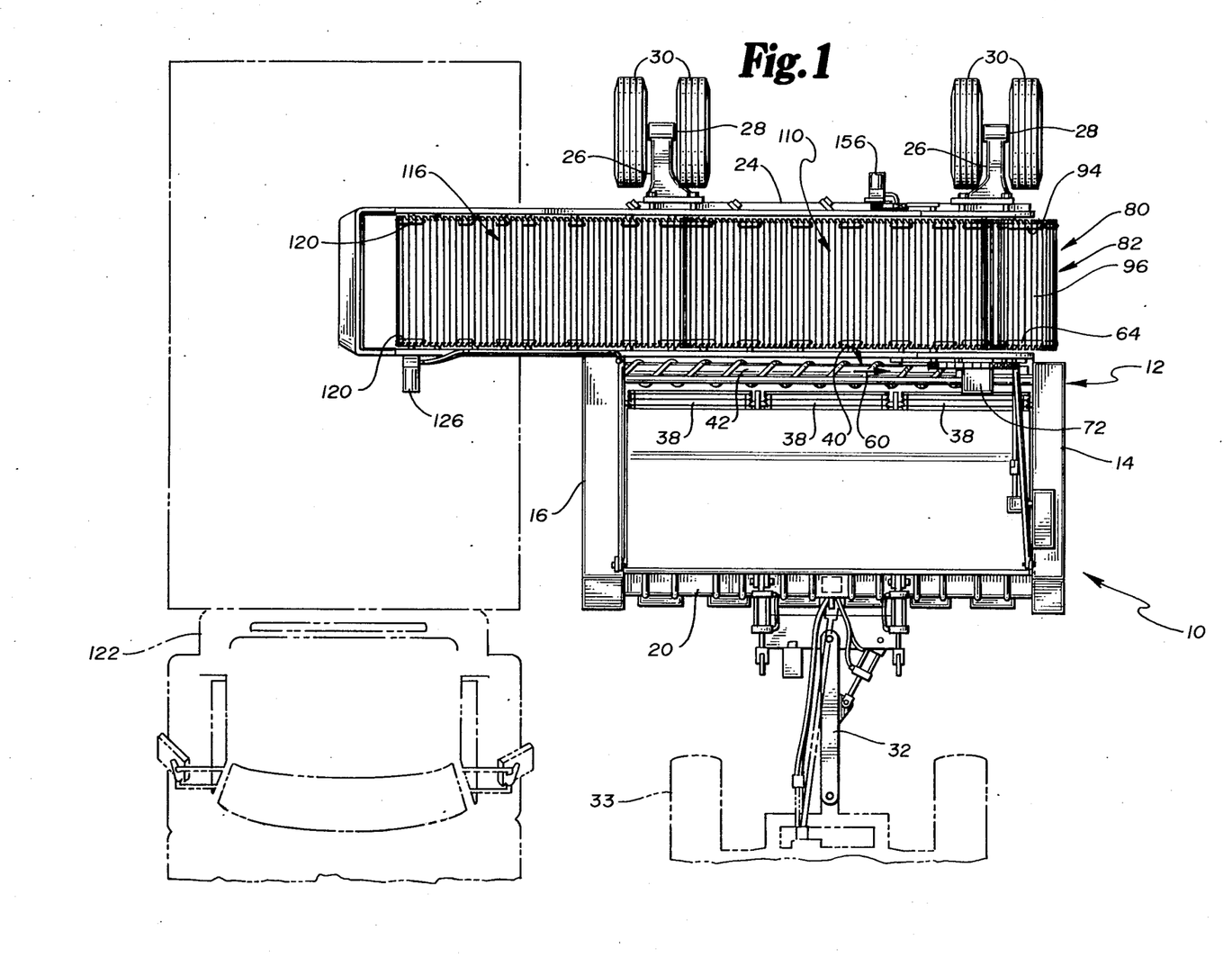
FIG. 1 is a top plan view of a sugar or red beet harvester exemplifying my invention.
Figure 2:
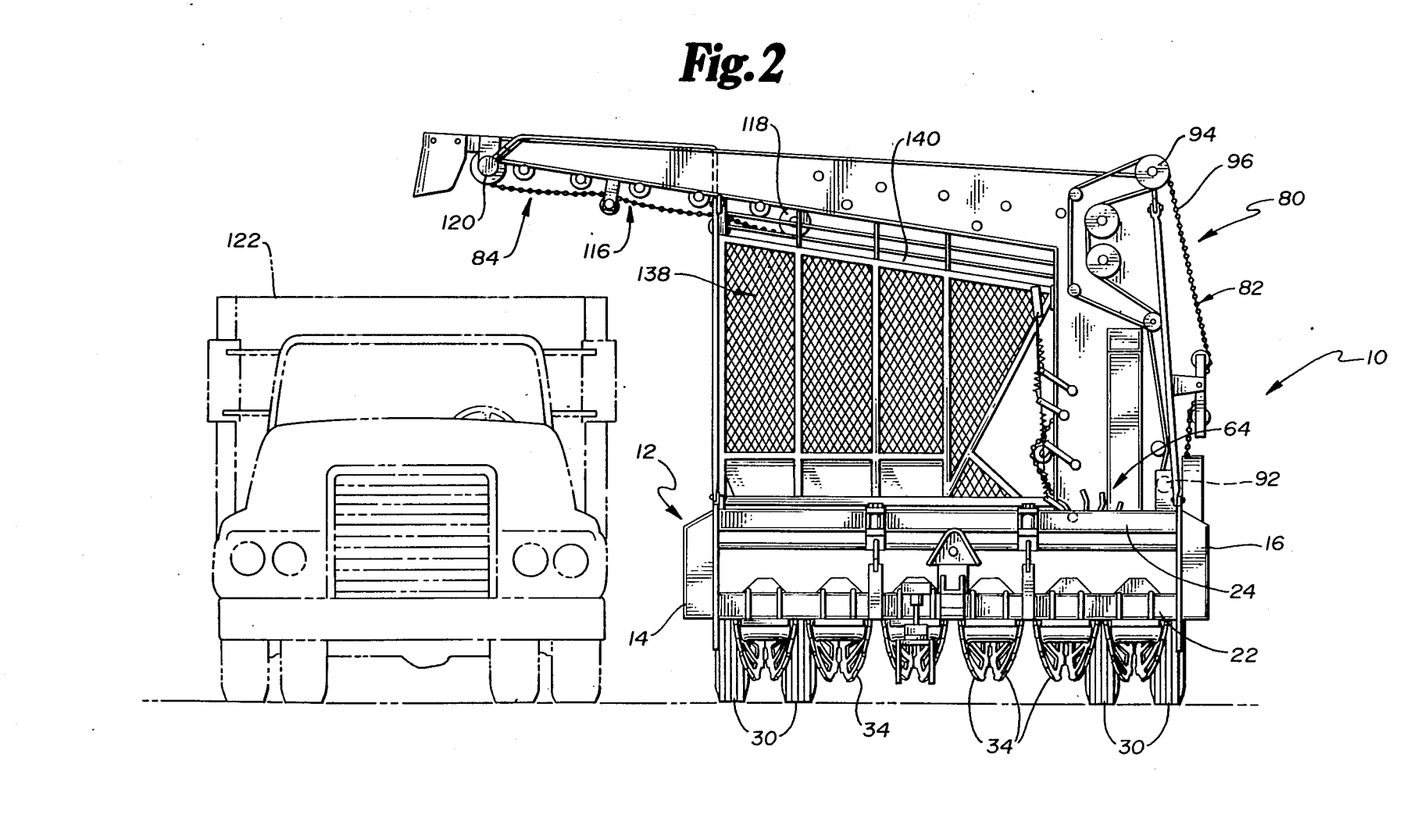
FIG. 2 is a front elevational view with a phantomly depicted truck at one side, the lifter wheels, however, being raised.
Figure 3:
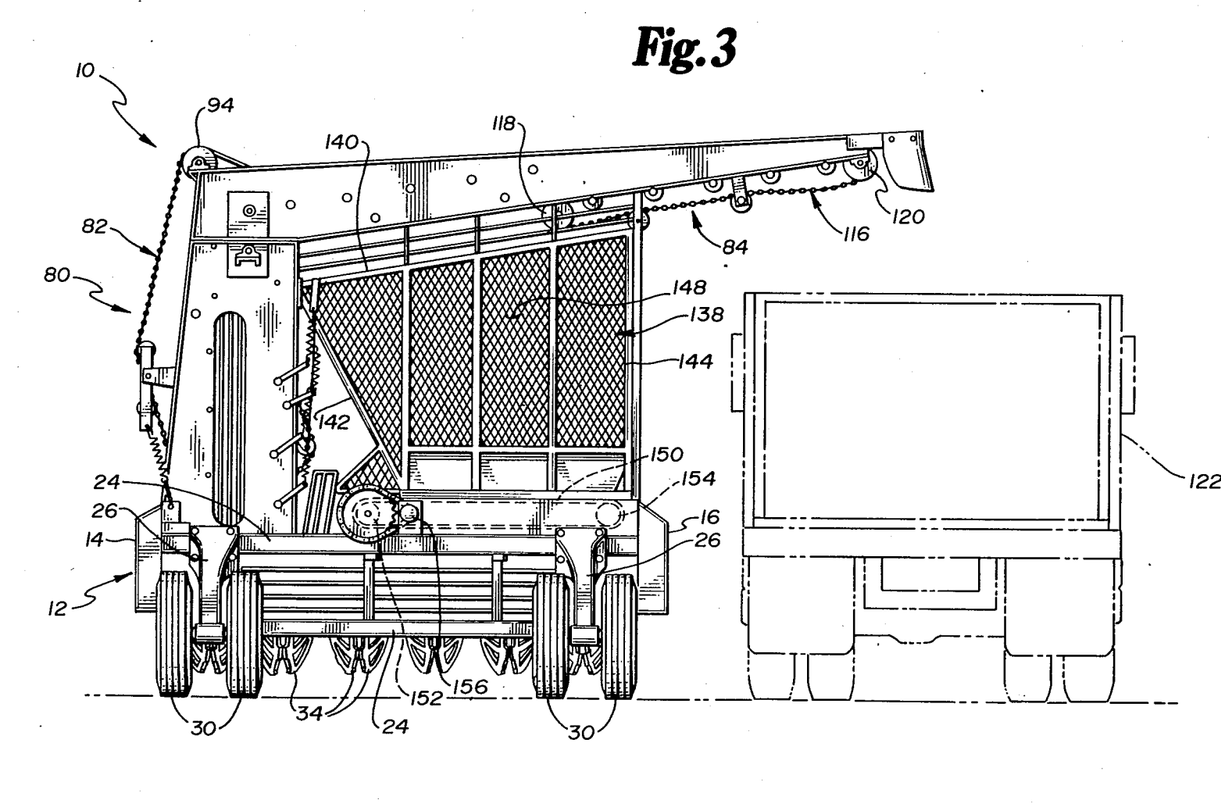
FIG. 3 is a rear elevational view of the harvester with the truck again included and with the lifter wheels raised.
Figure 4:
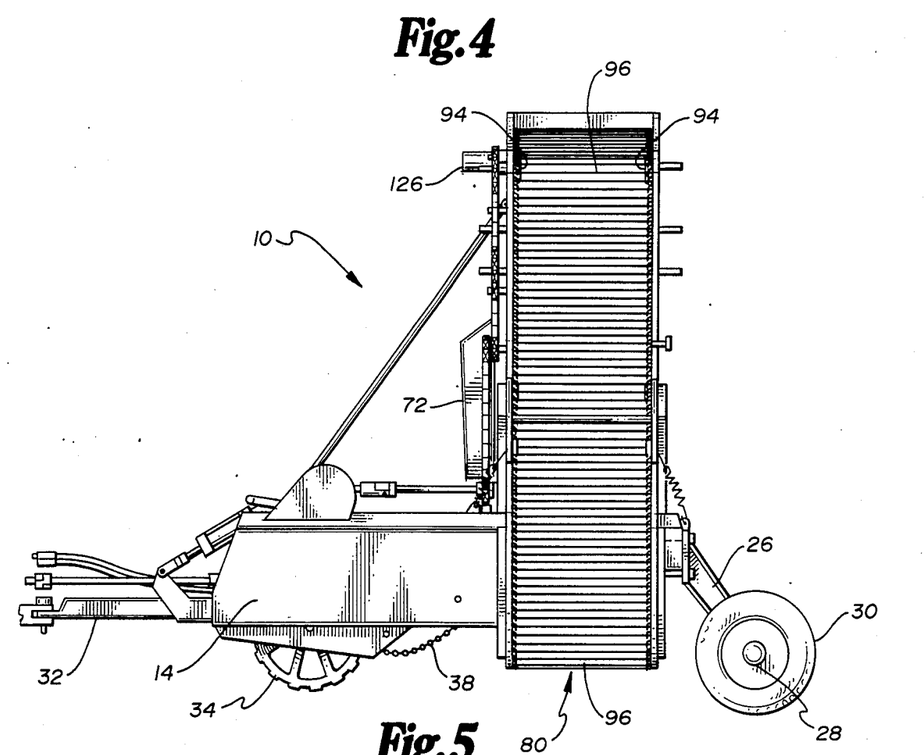
FIG. 4 is a side elevational view of the harvester taken from the right, the truck being omitted.
Figure 5:
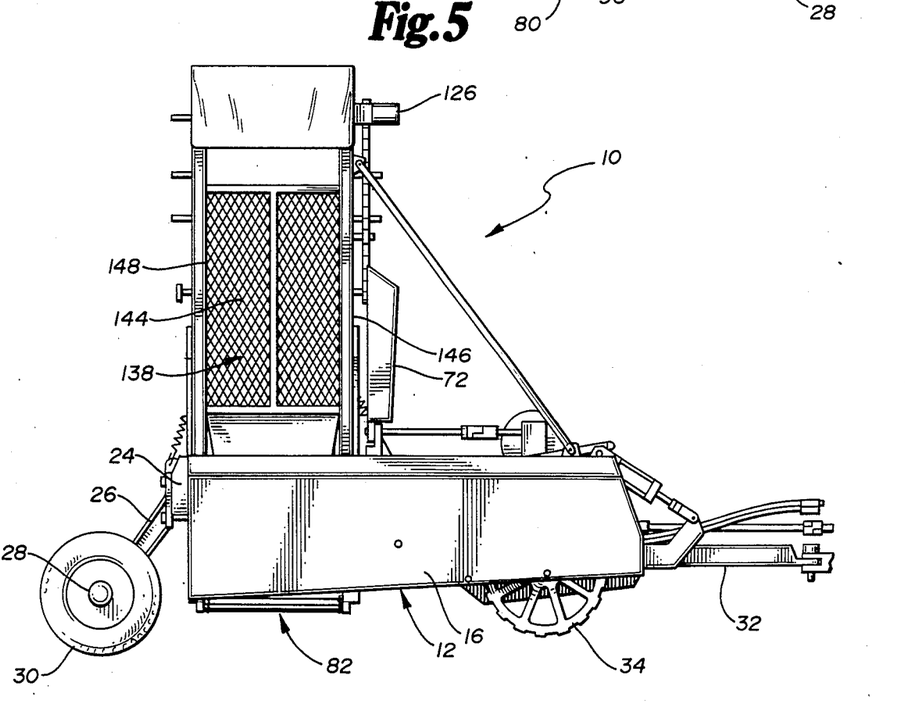
FIG. 5 is a side elevational view taken from the left, the truck again being omitted.

Although the conveyor unit 116 is driven by an individual hydraulic motor, it is not deemed necessary to show such a motor. However, as far as the reversible hydraulic motor 126 is concerned, it is considered important to show this motor 126, not only in FIG. 1 but also in the hydraulic schematic diagram appearing in FIG. 9. It might be helpful to apply an arrow 130 to indicate the direction in which the upper flight of the conveyor unit 110 moves; this direction does not change. As far as the second unit 116 is concerned, the solid arrow 132 signifies the direction the upper flight of this unit 116 moves when dumping or discharging into the truck 122 when at the right side of the harvester 10, whereas the dotted arrow 136 indicates a reverse movement of the unit 116.

Reference will now be made to a storage tank 138 having an open top at 140. The tank 138 is constructed so as to enable the operator to see completely through the tank 138. Consequently, the tank 138 has open mesh side walls 142 and 144, a front open mesh wall 146 and a rear open mesh wall 148. These walls 142, 144, 146, 148 can be of so-called expanded metal, the existence and fabrication of which are well known. It should be noted, though, that the side wall 144, this being at the right side of the harvester 10, is higher than the left side wall 142. As the description further develops, it will be seen that the right side 142 of the tank 138, being higher than the left side 144, will accommodate a greater quantity of sugar beets than the left side. This serves to even more fully balance the two sides of the harvester 10.

Whereas the walls 142, 144, 146 and 148 are open mesh walls, the bottom wall is in the form of a conveyor unit 150 entrained about sprockets 152 and 154. The hydraulic motor, which has been labeled 156, is important to achieving desired optimum operating condition of the harvester 10. Although it does not rotate constantly, when the hydraulic motor 156 is rotating, it is always in the same direction so as to move the upper flight of the conveyor unit 150 in the direction of the arrow 158, that is, toward the left side of the harvester 10. It is also important to observe that the left side wall 142 resides in a spaced relationship with the left end of the conveyor unit 150, thereby forming a discharge opening 159 so that beets stored in the tank 138 can be discharged from the tank 138 onto the horizontal section of the outboard unit 86 belonging to the elevator 80.

Figure 9:
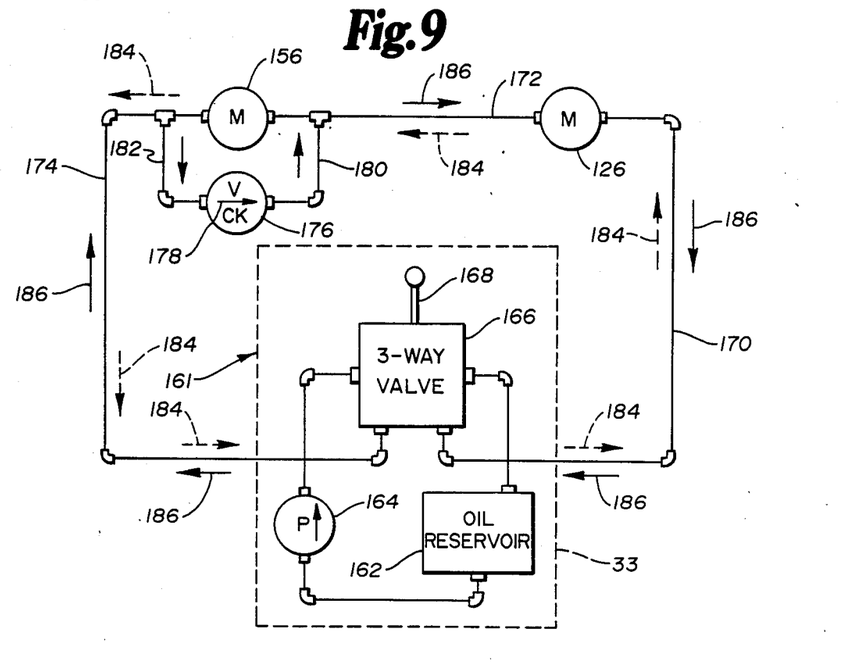
FIG. 9 is a schematic view of the hydraulic system utilized in directing the beets that have been elevated either into the truck or into the tank.

Having referred to the hydraulic motors 126 and 156, attention is now directed to FIG. 9 where the salient portion of a hydraulic system 160 is diagrammatically presented. The hydraulic system 160 includes a portion of the hydraulic system belonging to the tractor 33, the portion being labeled 161 in FIG. 9. The system portion 161 is conventional, including an oil reservoir 162, a pump 164, a 3-way valve 166 having an operating lever 168 which determines the flow or direction in which the oil from the reservoir 162 is directed. The flexible tubes connecting the 3-way valve 166 in circuit with the motors 126, 156 on the harvester 10 includes a first flexible tube or conduit 170 that leads directly to the motor 126. From the motor 126 a flexible tube 172 extends to the motor 156, and a third tube 174 extends from the motor 156 back to the 3-way valve 166. Additionally, a check valve 176 performs a bypass function, permitting an oil flow only in the direction of arrow 178 and blocking any oil flow in a reverse direction. The check valve 176 is Tee-connected to the tube 172 by a tube or conduit 180, and is Tee-connected to the tube 174 by means of still another tube 182.

It perhaps will be of benefit to apply a sequence of broken arrows 184 signifying the flow of oil that causes both motors 126 and 156 to operate; this in turn causes the conveyor units 116 and 150 to move in the direction of their respective arrows 132 and 158. All that the operator need do is to swivel or tilt the lever 168 in one direction to achieve this flow mode and the desired rotation of both motors 126 and 156 in that the motors 126, 156 are at this time connected in a serial relationship so that the same oil controlled by the valve 166 flows through both motors 126, 156. This will cause the conveyor unit 116 to dump or discharge the elevated beets being advanced thereby into the truck 122. On the other hand, when the lever 168 is swung so as to reverse the flow of oil, as indicated by the solid arrows 186, then the reverse flow is caused to bypass the motor 156 so that it does not rotate and the conveyor unit 150 at the bottom of tank 138, with which this motor 156 is associated, remains stationary. Nonetheless, the reverse flow of oil in the direction of the solid arrows 186 produces a reverse rotation of the motor 126 with the consequence that the conveyor unit 116 rotates in the direction of its arrow 130. It must be borne in mind that the first conveyor unit 110 is rotating in the direction of the arrow 130 so as to discharge beets onto the second unit 116. However, with the unit 116 moving in a reverse direction as indicated by the arrow 136, the beets are not discharged into the truck but are directed through the gap 128 into the tank 138.

With the foregoing in mind, the benefits to be derived from a practicing of my invention should be readily apparent. Nonetheless, a brief operational description will be of assistance in appreciating all of the advantages to be gained from the method and apparatus 10 herein described.

For the sake of discussion, it will be assumed that the sugar beet harvester 10 is making its first pass over a sugar beet field, moving in a northerly direction. The truck 122 under these circumstances will be trailing the harvester 10, for if it were to the right of the harvester 10 so as to receive beets discharged from the inclined portion 84 of the elevator 80, the truck 122 would be running over approximately six rows of unharvested beets. Therefore, by trailing the harvester 10, the truck 122 will be traveling over six rows where the beets have already been dug up by the lifter wheel assemblies 34. It will be appreciated that the lifter wheel assemblies 34 perform the digging operation and the beets are kicked or removed therefrom by the paddles 36 and that the inclined chain bed conveyors 38 advance the beets onto the cleaning bed 40.

It is upon the arrival of the beets at the cleaning bed 40 that a unique movement thereof is effected by virtue of the helical rib 50 on the grab roll 42. This rib 50 provides a gentle movement of the beets centrally, that is, in the direction of the arrow 60. However, other beets being delivered onto the cleaning bed 40 from the other chain bed conveyor 38 will push beets onto the grab roll 44 which would move the beets immediately toward the base or lower entrance end of the elevator 80. This, if allowed to happen, would literally short-circuit the cleaning process. However, the reverse helical direction of the rib 50, together with the assistance provided by the wheel rake 64, assures a central movement of the beets so that they are not immediately delivered to the base or lower end of the elevator 80.

The beets, when they leave the cleaning bed 40, are virtually devoid of dirt and debris, for the cleaning bed 40 constitutes a second stage of the cleaning process, the first cleaning stage being performed by the inclined chain bed conveyors 38.

From FIG. 8, it will be discerned that the beets are shifted from the cleaning bed 40 onto the horizontal lower portion of the elevator 80 and then both of the units 86, 100 function to elevate the beets upwardly in the direction of the arrows 98 and 108. It will be recalled that the outboard unit 86 is moving at a somewhat faster rate than the inboard unit 100 so that when the beets reach the top of the squeeze chain portion 82, the beets are successivly shifted onto the left end of the conveyor unit 110. They continue to move in the direction of the arrow 130, being soon discharged or transferred onto the left end of the second conveyor unit 116.

On the first pass over the field, one does not wish to continually discharge the beets into the truck 122, for the truck 122 would then have to be along the right side of the harvester 10 and would be running over approximately six rows of unharvested beets. Consequently, it is during the first pass over the field that the conveyor unit 116 is reversely rotated so as to direct the beets into the tank 138 rather than into the truck 122. Since the tank 138 is of limited capacity, it might very well, and usually does, become full before the first pass is completed. Obviously, the number of times that the tank 138 becomes full depends upon the size of the sugar beet field.

However, when the tank 138 does become full, all that the truck 122 need do is pull alongside the harvester 10 from its trailing position, preferably while the harvester 10 has been stopped so as to avoid running over any more unharvested beets than necessary. It is under these conditions that the lever 168 is manually moved so as to cause the hydraulic fluid to move in the direction of the solid arrows 186. Owing to the fact that the check valve 176 permits passage of oil only in the direction of its arrow 178, the motor 156 is bypassed and remains stationary. Yet, the motor 126 rotates so as to deliver the elevated beets into the tank 138. Due to the fact that the conveyor unit 150, which constitutes the bottom of the tank 138, is not moving, the tank 138 is progressively filled. When the tank 138 continues to fill, it will be recognized that the right side of this tank 138, the wall 144 being higher than the wall 142, enables more beets to accumulate at the right side of harvester 10 than at the left side. Coupled with the overhanging or extending end of the conveyor unit 116, the increase in weight at the right offsets some of the weight of elevator 80 concentrated at the left. In other words, the filling of the tank 138 is instrumental in better balancing the overall distribution of weight as far as the harvester 10 is concerned.

It is when the tank 138 becomes full that the truck 122 is permitted to move into a position adjacent the right side of sugar beet harvester 10. Admittedly, the truck will be passing over rows of unharvested beets at this time, but this is minimal compared to if the truck 122 would continually be on the right side during the first traverse of the field.

Thus, while the truck 122 may very well pull alongside the harvester 10 several times during the first pass over the sugar beet field, it is when the harvester 10 turns around, doing so toward the east, and then initiates its second pass or traverse over the field in a southerly direction, that the truck 122 can be constantly at the right side of the harvester 10, for the harvester 10 has now removed beets from six-rows south toward the west thereof. The tank 138 need not be filled at all during the second pass in an opposite direction over the field. Obviously, subsequent passes enable the truck 122 to always be traversing harvested rows rather than unharvested rows.

It is important to appreciate that prior art sugar beet harvesters have required the truck or other gathering vehicle to run over unharvested rows, not only on the first pass over the field but on the second pass as well. When practicing my method and utilizing my apparatus, it is only during the first pass that the truck 122 runs over any unharvested beets, and even then only intermittently when the directions of generally horizontal conveyor units 110 and 116 are properly controlled with the lever 168 of the 3-way valve 166. The intermittent operation of the conveyor units 110 and 116 is dictated by the somewhat limited holding capacity of the tank 138.

It should be obvious from the foregoing that the discharge of the elevated beets from the side of the harvester 10 opposite the side that they are elevated balances the overall weight or mass of the harvester 10 so that the weight carried by the two pairs of wheels 30 at the rear of the frame 12 can carry substantially equal loads. It is not essential that there be a perfect balance, but the small degree of unbalance is not objectionable, whereas a severe unbalance, as experienced with prior art harvesters, will cause the harvester 10 to list or tilt to the right, particularly where soft soil conditions are experienced because the right pair of wheels of such prior art harvesters would then sink more deeply into the ground. When one set of wheels sink deeper into the ground, it follows that the entire harvester will not pull straight, as heretofore experienced. Also, and this is very important to appreciate, the lifting wheels 34, where there is a significant tilting of the harvester, as in the past, will dig at different depths, lifting too much mud on the elevator or right side and breaking off beets on the other or left side. The foregoing will not happen with my apparatus 10 and it has a decided advantage over other prior art arrangements by virtue of the lack of tilt feature alone. Also, better cleaning and a more versatile control of the beets are inherent in the utilization of my method and the apparatus associated therewith.

I claim:

1. A beet harvester comprising a frame having front, rear and laterally spaced sides, wheel means supporting the rear of said frame, and elevator means including a first portion mounted on said frame at one side thereof extending upwardly to a preferred height above said frame, said first portion including vertical outboard and inboard units, and said elevator means also including a second portion extending transversely and generally horizontally from the upper end of said inboard unit to a location above the opposite side of the frame, the second portion of said elevator means projecting somewhat beyond the opposite side of the frame whereby beets enter said elevator means at said one side and are discharged adjacent said opposite side.

2. A beet harvester in accordance with claim 1 including a tank on said frame located beneath the transversely second extending portion of said elevator means, the second portion of said elevator means also projecting beyond said tank at said opposite side of the frame.

3. A beet harvester in accordance with claim 2 in which said tank has front, rear and laterally spaced sidewalls, said front and rear walls being of open mesh construction.

4. A beet harvester in accordance with claim 2 in which the transverse second portion of said elevator means inclines slightly upwardly from said one side toward said opposite side.

5. A beet harvester in accordance with claim 4 in which the upper edges of said front and rear walls also incline upwardly, the upper edge of the sidewall adjacent said opposite side being higher than the sidewall adjacent said one side.

6. A beet harvester in accordance with claim 2 in which the transverse second portion of said elevator means includes first and second conveyor units, said first conveyor unit having one end adjacent the upper end of said inboard unit at said one side and having its other end intermediate said one side and said opposite side, and said second conveyor unit having one end adjacent the other end of said first conveyor unit and having its other end projecting beyond said opposite side, the second end of said first conveyor unit being spaced above the first end of said second conveyor unit so that said first conveyor unit shifts its beets onto said second conveyor unit.

7. A beet harvester in accordance with claim 6 including means for causing said second conveyor unit to shift beets in the same direction as said first conveyor unit so that beets can be discharged from the second end of said second conveyor unit to a transport vehicle located adjacent said opposite side of the frame.

8. A beet harvester in accordance with claim 7 including means for reversing the movement of said second conveyor unit so that beets can be discharged from the first end of said second conveyor unit into said tank.

9. A beet harvester in accordance with claim 8 including a third conveyor unit at the bottom of said tank having first and second ends, the first end of said third conveyor unit being nearer said one side of the frame and also adjacent the lower end of said elevator means so that beets stored in said tank may be transferred from the first end of said third conveyor unit to said elevator means.

10. A beet harvester in accordance with claim 9 including a grab roll assembly for initially directing beets to the lower ends of said outboard and inboard units of said elevator means.

11. A beet harvester in accordance with claim 10 in which said grab roll assembly includes a plurality of ribbed rolls, and a plurality of ribless rolls, one ribless roll being between adjacent ribbed rolls, said ribbed rolls having helical ribs thereon so that beets are directed to the lower ends of said outboard and inboard units of said elevator means when said ribbed rolls are rotated in one direction.

12. A beet harvester in accordance with claim 11 in which said grab roll assembly includes an additional ribbed roll having its helical rib extending in a direction to move certain beets in a direction initially away from the lower ends of said outboard and inboard units of said elevator means.

13. A beet harvester in accordance with claim 12 including means for assisting said additional ribbed roll in moving said certain beets in said direction away from said elevator means.

* * * * *